United States Patent
Lee et al.

(10) Patent No.: US 11,100,206 B2
(45) Date of Patent: Aug. 24, 2021

(54) ELECTRONIC DEVICE AND METHOD FOR CONTROLLING ACTIVATION OF CAMERA MODULE

(71) Applicant: SAMSUNG ELECTRONICS CO., LTD., Suwon-si (KR)

(72) Inventors: Woo-Yong Lee, Hwaseong-si (KR); Jun-Ho An, Yongin-si (KR); Hye-Jin Kang, Suwon-si (KR); Min-Sheok Choi, Suwon-si (KR); Jong-Hun Won, Suwon-si (KR); Ki-Huk Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 6 days.

(21) Appl. No.: 16/321,132

(22) PCT Filed: Jul. 11, 2017

(86) PCT No.: PCT/KR2017/007386
§ 371 (c)(1),
(2) Date: Jan. 28, 2019

(87) PCT Pub. No.: WO2018/021726
PCT Pub. Date: Feb. 1, 2018

(65) Prior Publication Data
US 2019/0171804 A1      Jun. 6, 2019

(30) Foreign Application Priority Data

Jul. 29, 2016   (KR) .................. 10-2016-0097446

(51) Int. Cl.
G06F 21/32      (2013.01)
H04N 5/33       (2006.01)
(Continued)

(52) U.S. Cl.
CPC ............. *G06F 21/32* (2013.01); *G01J 5/48* (2013.01); *G06K 9/00* (2013.01); *G06K 9/00604* (2013.01);
(Continued)

(58) Field of Classification Search
CPC ......................... G06F 21/32; G06K 9/00604
See application file for complete search history.

(56) References Cited

U.S. PATENT DOCUMENTS

| 2012/0188355 A1 | 7/2012 | Omi et al. | |
| 2013/0041221 A1* | 2/2013 | McDowall | A61B 1/00096 600/111 |

(Continued)

FOREIGN PATENT DOCUMENTS

| KR | 10-0296305 | 7/2001 |
| KR | 10-2007-0094112 | 9/2007 |

(Continued)

OTHER PUBLICATIONS

International Search Report for PCT/KR2017/007386 dated Oct. 19, 2017, 4 pages.

(Continued)

*Primary Examiner* — Jerry T Jean Baptiste
(74) *Attorney, Agent, or Firm* — Nixon & Vanderhye, P.C.

(57) ABSTRACT

The present invention provides an electronic device and method for controlling the activation of a camera module. An electronic device according to various examples comprises: a sensor module; a first camera module including a first camera and a light emitting part; a second camera module; and a processor electrically connected to the sensor module, the first camera module, and the second camera module, wherein the processor determines whether an object is positioned within a first distance through the sensor (Continued)

module, inactivates the light emitting part or the first camera and the light emitting part of the first camera module if the object is positioned within the first distance, determines the distance between the object and the electronic device by using the second camera module, activates the light emitting part or the first camera and the light emitting part if the determined distance is greater than or equal to a second distance, and can perform iris authentication by using the first camera module. In addition, other examples are possible.

20 Claims, 11 Drawing Sheets

(51) Int. Cl.
  *G06K 9/00* (2006.01)
  *G01J 5/48* (2006.01)
  *H04N 5/225* (2006.01)
  *H04M 1/72463* (2021.01)
  *H04M 1/67* (2006.01)

(52) U.S. Cl.
  CPC .... *G06K 9/00617* (2013.01); *H04M 1/72463* (2021.01); *H04N 5/2256* (2013.01); *H04N 5/2258* (2013.01); *H04N 5/33* (2013.01); *H04M 1/67* (2013.01); *H04M 2250/52* (2013.01)

(56) References Cited

U.S. PATENT DOCUMENTS

| | | | |
|---|---|---|---|
| 2015/0054734 A1* | 2/2015 | Raghoebardajal | ... G02B 27/017 345/156 |
| 2015/0254508 A1* | 9/2015 | Kimura | .............. G06K 9/00604 382/117 |
| 2015/0364107 A1* | 12/2015 | Sakariya | ................. G06F 3/042 345/174 |
| 2016/0034759 A1 | 2/2016 | Jung | |
| 2016/0188974 A1* | 6/2016 | Mullin | ............... G06K 9/00604 348/78 |
| 2017/0019577 A1* | 1/2017 | Tan | ......................... H04N 5/33 |
| 2017/0070680 A1* | 3/2017 | Kobayashi | ......... H04N 5/23293 |
| 2019/0173987 A1* | 6/2019 | Sung | .................... G02B 26/007 |

FOREIGN PATENT DOCUMENTS

| | | |
|---|---|---|
| KR | 10-2009-0106792 | 10/2009 |
| KR | 10-2014-0109158 | 9/2014 |
| KR | 10-2015-0139379 | 12/2015 |
| KR | 10-2016-0016277 | 2/2016 |

OTHER PUBLICATIONS

Written Opinion of ISA for PCT/KR2017/007386 dated Oct. 19, 2017, 4 pages.

\* cited by examiner

ELECTRONIC DEVICE AND METHOD FOR CONTROLLING ACTIVATION OF CAMERA MODULE

This application is the U.S. national phase of International Application No. PCT/KR2017/007386 filed Jul. 11, 2017 which designated the U.S. and claims priority to KR Patent Application No. 10-2016-0097446 filed Jul. 29, 2016, the entire contents of each of which are hereby incorporated by reference.

TECHNICAL FIELD

Various embodiments of the present disclosure relate to an electronic device and method for controlling activation of a camera module.

DESCRIPTION OF RELATED ART

Recently, the security of portable terminals has been reinforced by performing authentication with respect to a user of the portable terminal by using various authentication schemes. For example, for iris authentication, an infrared camera and an infrared light-emitting diode (LED) provided in the portable terminal may be used. According to an embodiment, the portable terminal activates the infrared camera and the infrared LED to output infrared light through the infrared LED and captures an infrared image using the infrared camera. The portable terminal detects iris information (e.g., an iris image or pattern) from the captured infrared image, compares the detected iris information with previously stored iris information, and completes iris authentication when the detected iris information is identical to the previously stored iris information.

However, when a user's eye is exposed to light output through the infrared LED for a long time, negative effects such as blurred vision may occur.

Recently, to prevent such damage, various methods for protecting user's eyes have been required.

SUMMARY

Various embodiments provide an electronic device and method for controlling the activation of a camera module to perform iris authentication while protecting a user's eye.

Various embodiments provide an electronic device and method for controlling the activation of a camera module.

According to various embodiments, an electronic device includes a sensor module, a first camera module including a first camera and a light-emitting unit, a second camera module, and a processor electrically connected with the sensor module, the first camera module, and the second camera module, in which the processor is configured to determine whether an object is located within a first distance by using the sensor module, to deactivate the light-emitting unit of the first camera module or both the first camera and the light-emitting unit when the object is located within the first distance, to determine the distance between the object and the electronic device, using the second camera module, and to activate the light-emitting unit or both the light-emitting unit and the light-emitting unit and perform iris authentication using the first camera module, when the determined distance is greater than or equal to a second distance.

According to various embodiments, in a storage medium having stored therein instructions that cause, when executed by at least one processor, the at least one processor to perform at least one operation, the at least one operation includes determining whether an object is located within a first distance by using a sensor module, deactivating a light-emitting unit of a first camera module, which includes a first camera and the light-emitting unit, or both the first camera and the light-emitting unit, when the object is located within the first distance, determining the distance between the object and the electronic device, using a second camera module, and activating the light-emitting unit or both the light-emitting unit and the light-emitting unit and perform iris authentication using the first camera module, when the determined distance is greater than or equal to a second distance.

According to various embodiments, an operation method for an electronic device includes determining whether an object is located within a first distance by using a sensor module, deactivating a light-emitting unit of a first camera module, which includes a first camera and the light-emitting unit, or both the first camera and the light-emitting unit, when the object is located within the first distance, determining the distance between the object and the electronic device, using a second camera module, and activating the light-emitting unit or both the light-emitting unit and the light-emitting unit and perform iris authentication using the first camera module, when the determined distance is greater than or equal to a second distance.

According to various embodiments, the present disclosure may activate or deactivate an infrared camera and an infrared LED, which affect user's vision, based on the distance between the user and the electronic device, thereby safely protecting the user's vision and facilitating iris authentication.

DETAILED DESCRIPTION OF EXAMPLE EMBODIMENTS

Figure 1:
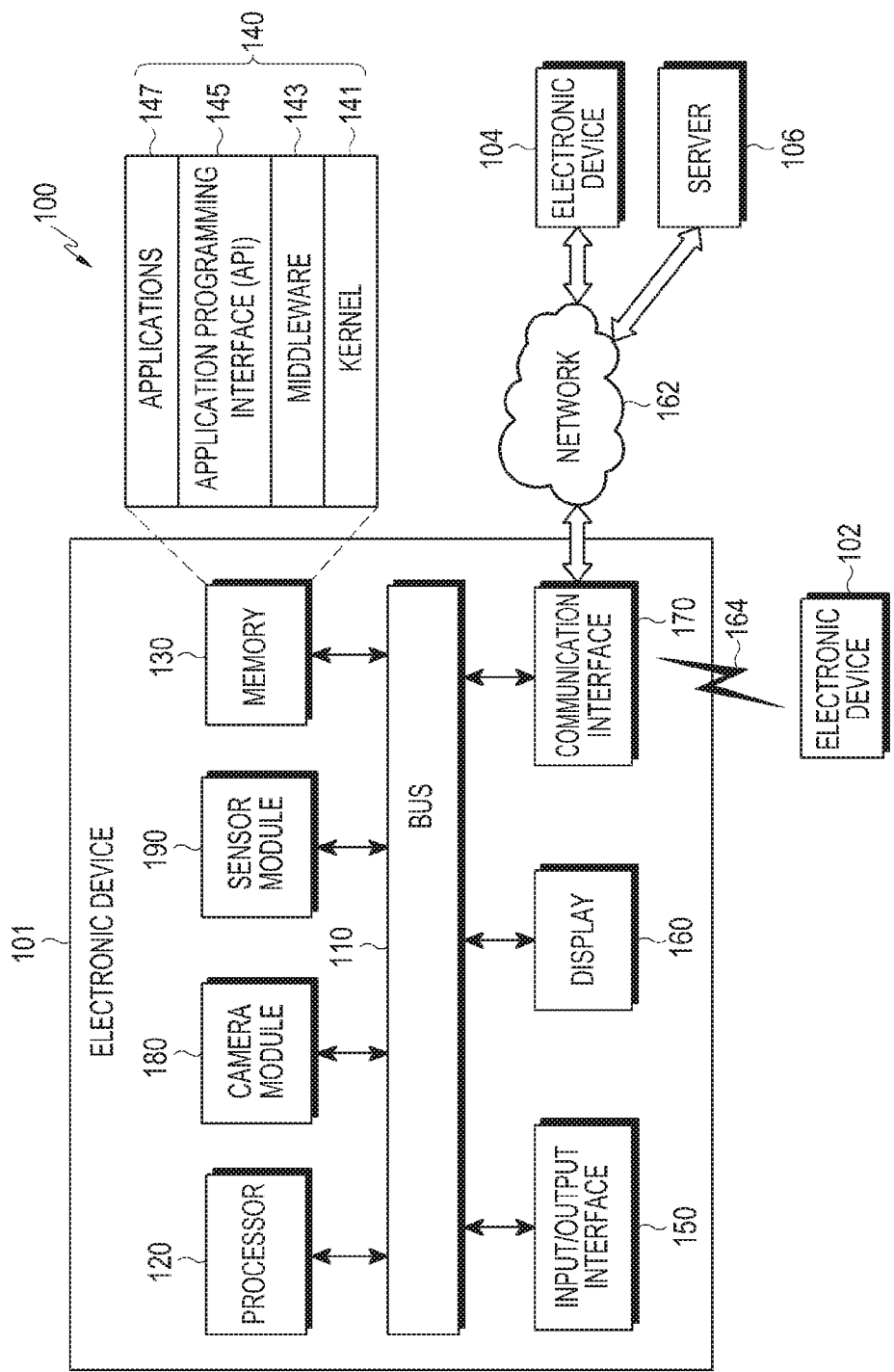
FIG. 1 illustrates a network environment including an electronic device according to various embodiments.

Hereinafter, various embodiments of the present disclosure will be disclosed with reference to the accompanying drawings. Embodiments and terms used therein are not intended to limit the present disclosure to particular embodiments, and it should be construed as including various modifications, equivalents, and/or alternatives according to the embodiments of the present disclosure. With regard to the description of the drawings, similar reference numerals may be used to refer to similar or related elements. It is to be understood that a singular form of a noun corresponding to an item may include one or more of the things, unless the relevant context clearly indicates otherwise. In the present disclosure, an expression such as "A or B," "at least one of A or/and B," or "one or more of A or/and B" may include all possible combinations of together listed items. Expressions such as "first," "second," "primarily," or "secondary," used herein may represent various elements regardless of order and/or importance and do not limit corresponding elements. When it is described that an element (such as a first element) is "operatively or communicatively coupled with/to" or "connected" to another element (such as a second element), the element can be directly connected to the other element or can be connected to the other element through another element (e.g., a third element).

An expression "configured to (or set)" used in the present disclosure may be replaced with, for example, "suitable for," "having the capacity to," "adapted to," "made to," "capable of," or "designed to" according to a situation. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a central processing unit (CPU) or an application processor) that can perform a corresponding operation by executing at least one software program stored at a memory device.

Examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. In some embodiments, the electronic device may include, for example, a television (TV), a digital video disk (DVD) player, audio equipment, a refrigerator, an air conditioner, a vacuum cleaner, an oven, a microwave oven, a laundry machine, an air cleaner, a set-top box, a home automation control panel, a security control panel, a TV box (e.g., Samsung HomeSync™, Apple TV™, or Google TV™), a game console, an electronic dictionary, an electronic key, a camcorder, and an electronic frame.

In other embodiments, the electronic device may include at least one of various medical equipment (for example, magnetic resonance angiography (MRA), magnetic resonance imaging (MRI), computed tomography (CT), an imaging device, or an ultrasonic device), a navigation system, a global positioning system (GPS) receiver, an event data recorder (EDR), a flight data recorder (FDR), a vehicle infotainment device, electronic equipment for ships (e.g., a navigation system and gyro compass for ships), avionics, a security device, a vehicle head unit, an industrial or home robot, a drone, an automatic teller's machine (ATM), a Point of Sales (POS), Internet of things (e.g., electric bulbs, various sensors, electricity or gas meters, sprinkler devices, fire alarm devices, thermostats, streetlights, toasters, exercise machines, hot-water tanks, heaters, boilers, and so forth). According to some embodiments, the electronic device may include a part of a furniture, building/structure or a part of a vehicle, an electronic board, an electronic signature receiving device, a projector, and various measuring instruments (e.g., a water, electricity, gas, electric wave measuring device, etc.). According to various embodiments, the electronic device may be flexible or may be a combination of two or more of the above-described various devices. According to an embodiment of the disclosure, the electronic device is not limited to those described above. Herein, the term "user" used in various embodiments of the present disclosure may refer to a person who uses the electronic device or a device using the electronic device.

Referring to FIG. 1, an electronic device 101 in a network environment 100 according to various embodiments is disclosed. The electronic device 101 may include a bus 110, a processor 120, a memory 130, an input/output (I/O) interface 150, a display 160, a communication interface 170, a camera module 180, and a sensor controller 190. In some embodiments, the electronic device 101 may not include at least one of the foregoing elements or may further include other elements.

The bus 110 may include a circuit for connecting, e.g., the elements 110 to 170 and delivering communication (e.g., a control message or data) between the elements 110 to 170.

The processor 120 may include one or more of a central processing unit (CPU), an application processor (AP), and a communication processor (CP). The processor 120 performs operations or data processing for control and/or communication of, for example, at least one other elements of the electronic device 101.

According to an embodiment, to obtain an iris image, the processor 120 may determine whether an object (e.g., a user, a face, an eye, etc.) is located within a first distance through a sensor module 190 and deactivate a first camera module (e.g., a first camera, for example, an infrared (IR) camera) and a light-emitting unit (e.g., an IR light-emitting diode (LED)) of the camera module 180 when the object is located within the first distance. When the object is not located within the first distance, the processor 120 may activate the first camera module to obtain an iris image for iris authentication. For example, the first distance may be a distance in which eye damage is likely to occur by IR light.

According to an embodiment, the processor 120 may calculate a distance between the object and the electronic device 101 by using a second camera module of the camera module 180, determine whether the calculated distance is greater than or equal to a second distance, and activate the first camera module to obtain an iris image when the calculated distance is greater than or equal to the second distance. The processor 120 may deactivate the first camera module when the calculated distance is less than the second distance. For example, the second distance may be a distance in which eye damage is less likely to occur by IR light than the first distance while the iris image may be obtained.

The memory 130 may include a volatile and/or nonvolatile memory. The memory 130 may store, for example, instructions or data associated with at least one other elements of the electronic device 101.

According to an embodiment, the memory 130 may store software and/or a program 140. The program 140 may include at least one of, for example, a kernel 141, middleware 143, an application programming interface (API) 145, and/or an application program (or "application") 147, and the like. At least some of the kernel 141, the middleware 143, and the API 145 may be referred to as an operating system (OS).

The kernel 141 may control or manage, for example, system resources (e.g., the bus 110, the processor 120, the memory 130, etc.) used to execute operations or functions implemented in other programs (e.g., the middleware 143, the API 145, or the application program 147). The kernel 141 provides an interface through which the middleware 143, the API 145, or the application program 147 accesses separate components of the electronic device 101 to control or manage the system resources.

The middleware 143 may work as an intermediary for allowing, for example, the API 145 or the application program 147 to exchange data in communication with the kernel 141. In addition, the middleware 143 may process one or more task requests received from the application program 147 based on priorities. For example, the middleware 143 may give a priority for using a system resource (e.g., the bus 110, the processor 120, the memory 130, etc.) of the electronic device 101 to at least one of the application programs 147, and may process the one or more task requests. The API 145 is an interface used for the application 147 to control a function provided by the kernel 141 or the middleware 143, and may include, for example, at least one interface or function (e.g., an instruction) for file control, window control, image processing or character control. The I/O interface 150 may deliver, for example, an instruction or data input from a user or another external device to other component(s) of the electronic device 101, or output an instruction or data received from other component(s) of the electronic device 101 to a user or another external device.

The display 160 may include, for example, a liquid crystal display (LCD), a light emitting diode (LED) display, an organic light emitting diode (OLED) display, a microelectromechanical system (MEMS) display, or an electronic paper display. The display 160 may, for example, display various contents (e.g., a text, an image, video, an icon, and/or a symbol, etc.) to users. The display 160 may include a touch screen, and receives a touch, a gesture, proximity, a drag, a swipe, or a hovering input, for example, by using an electronic pen or a part of a body of a user.

The communication interface 170 establishes communication between the electronic device 101 and an external device (e.g., the vehicle device 102, the electronic device 104, or the server 106). For example, the communication interface 170 may be connected to a network 162 through wireless communication or wired communication to communicate with an external device (e.g., the second external electronic device 104 or the server 106).

Wireless communication may include a cellular communication protocol using at least one of, for example, long-term evolution (LTE), LTE advance (LTE-A), code division multiple access (CDMA), wideband CDMA (WCDMA), universal mobile telecommunications system (UMTS), wireless broadband (WiBro), global system for mobile communications (GSM), and so forth. According to an embodiment, the wireless communication may include at least one of Wireless Fidelity (WiFi), Bluetooth, Bluetooth Low Energy (BLE), Zigbee, near field communication (NFC), magnetic secure transmission (MST), radio frequency (RF), and a body area network (BAN). According to an embodiment, the wireless communication may include GNSS. The GNSS may include, for example, at least one of a global positioning system (GPS), a global navigation satellite system (Glonass), a Beidou navigation satellite system ("Beidou"), and Galileo, the European global satellite-based navigation system. Hereinbelow, "GPS" may be used interchangeably with "GNSS". The wired communication may include, for example, at least one of a USB (universal serial bus), a high definition multimedia interface (HDMI), a recommended standard (RS)-232, power line communication, a plain old telephone service (POTS), and so forth. The network 162 may include a telecommunications network, for example, at least one of a computer network (e.g., a local area network (LAN) or a wide area network (WAN)), Internet, and a telephone network.

The camera module 180 may include the first camera module that outputs image data (e.g., an IR image) using IR light and the second camera module that receives an optical signal and outputs image data (e.g., an RGB image).

The sensor module 190 may sense proximity of the object. According to an embodiment, the sensor module 190 may sense whether the object is located within the first distance. For example, the sensor module 190 may include a proximity sensor that senses proximity of the object.

Each of the first external electronic device 102 and the second external electronic device 104 may be a device of the same type as or a different type than the electronic device 101.

According to various embodiments, some or all of operations performed by the electronic device 101 may be performed in another electronic device or a plurality of electronic devices (e.g., the electronic device 102, 104 or the server 106).

According to an embodiment, when the electronic device 101 has to perform a function or a service automatically or at a request, the electronic device 101 may request another device (e.g., the electronic devices 102 or 104 or the server 106) to perform at least some functions associated with the function or the service instead of or in addition to executing the function or the service. The another electronic device (e.g., the electronic device 102 or 104 or the server 106) may execute the requested function or additional function and deliver the execution result to the electronic device 101. The electronic device 101 may then process or further process the received result to provide the requested function or service. To that end, a cloud computing, distributed computing, or client-server computing technology may be used, for example.

Figure 2:
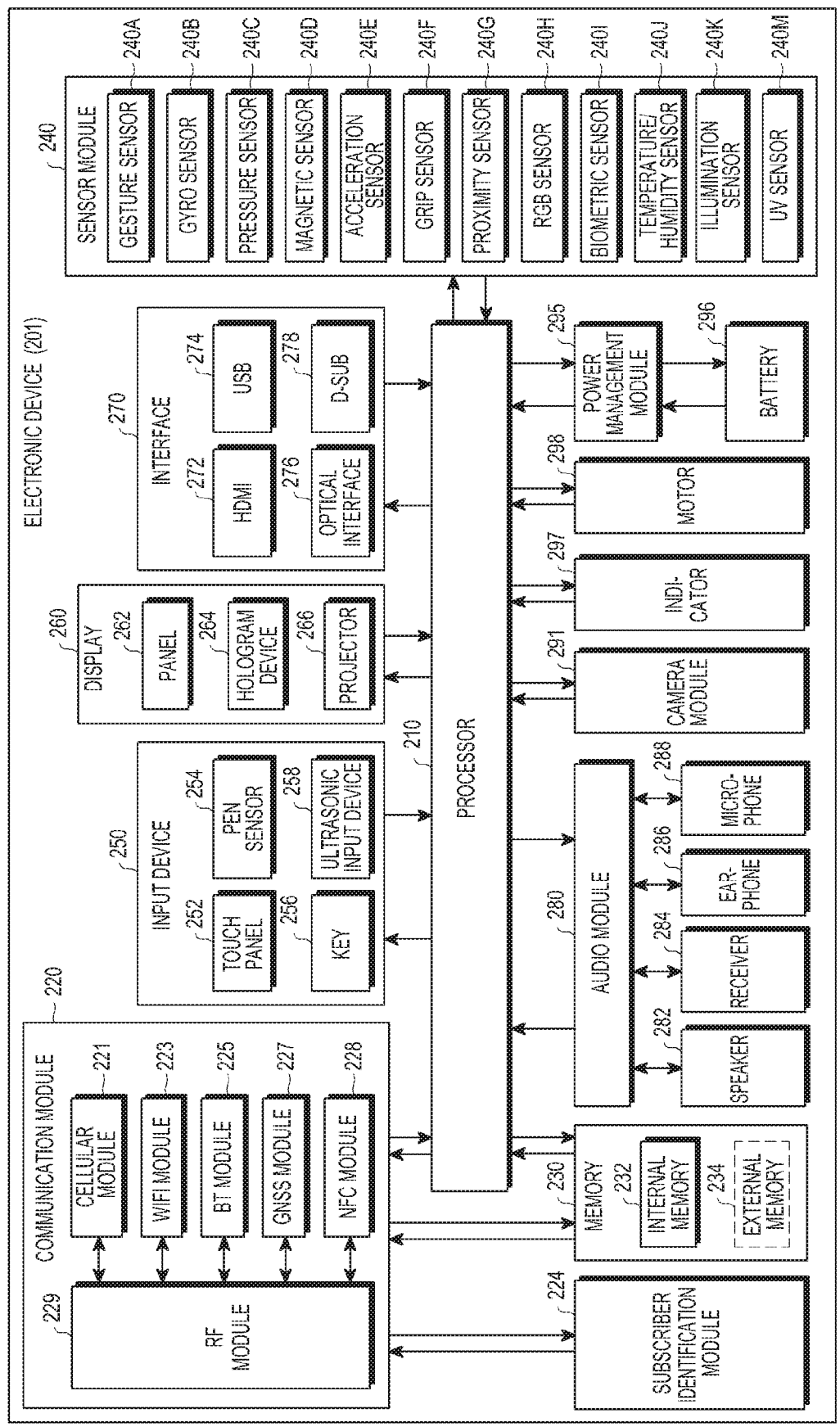
FIG. 2 is a block diagram of an electronic device according to various embodiments.

FIG. 2 is a block diagram of an electronic device 201 according to various embodiments. The electronic device 201 may form the entire electronic device 101 illustrated in FIG. 2 or a part of the electronic device 101 illustrated in FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 controls multiple hardware or software components connected to the processor 210 by driving an Operating System (OS) or an application program, and performs processing and operations with respect to various data. The processor 210 may be implemented with, for example, a system on chip (SoC).

According to an embodiment, the processor 210 may include a GPU and/or an image signal processor. The processor 210 may include at least some of the elements illustrated in FIG. 2 (e.g., the cellular module 221). The processor 210 loads an instruction or data received from at least one of other elements (e.g., a non-volatile memory)

into a volatile memory to process the instruction or data, and stores result data in the non-volatile memory.

According to an embodiment, for iris authentication, the processor 210 may determine whether the object is located within the first distance through the sensor module 240 (e.g., the proximity sensor 240G) and deactivate a first camera module (e.g., a first camera, for example, an infrared (IR) camera) and a light-emitting unit (e.g., an IR light-emitting diode (LED)) included in the camera module 291 when the object is located within the first distance. When the object is not located within the first distance, the processor 210 may activate the first camera module to obtain an iris image.

According to an embodiment, the processor 210 may calculate a distance between the object and the electronic device 101 by using a second camera module (e.g., a red/green/blue (RGB) camera module) included in the camera module 291, determine whether the calculated distance is greater than or equal to a second distance, and activate the first camera module to obtain an iris image when the calculated distance is greater than or equal to the second distance. The processor 210 may deactivate the first camera module when the calculated distance is less than the second distance.

The communication module 220 may have a configuration that is the same as or similar to the communication interface 170. The communication module 220 may include, for example, the cellular module 221, a WiFi module 223, a Bluetooth (BT) module 225, a GNSS module 227, a near field communication (NFC) module 228, and a radio frequency (RF) module 229. The cellular module 221 may provide, for example, a voice call, a video call, a text service, or an Internet service over a communication network. According to an embodiment, the cellular module 221 identifies and authenticates the electronic device 201 in a communication network by using the SIM 224 (e.g., a SIM card). According to an embodiment, the cellular module 221 performs at least one of functions that may be provided by the processor 210. According to an embodiment, the cellular module 221 may include a communication processor (CP). According to some embodiment, at least some (e.g., two or more) of the cellular module 221, the WiFi module 223, the BT module 225, the GNSS module 227, and the NFC module 228 may be included in one integrated chip (IC) or IC package. The RF module 229 may, for example, transmit and receive a communication signal (e.g., an RF signal). The RF module 229 may include a transceiver, a power amp module (PAM), a frequency filter, a low noise amplifier (LNA), at least one antenna, or the like. According to another embodiment, at least one of the cellular module 221, the WiFi module 223, the BT module 225, the GNSS module 227, and the NFC module 228 may transmit and receive an RF signal through the separate RF module. The SIM 224 may, for example, include a card including a SIM or an embedded SIM, and may include unique identification information (e.g., an integrated circuit card identifier (ICCID) or subscriber information (e.g., an international mobile subscriber identity (IMSI)).

The memory 230 (e.g., the memory 130) may, for example, include an internal memory 232 and/or an external memory 234. The internal memory 232 may, for example, include at least one of a volatile memory (e.g., dynamic random-access memory (DRAM), static RAM (SRAM), synchronous dynamic RAM (SDRAM), etc.), and a non-volatile memory (e.g., one time programmable read only memory (OTPROM), programmable ROM (PROM), erasable and programmable ROM (EPROM), electrically erasable and programmable ROM (EEPROM), etc.), mask ROM, flash ROM, a flash memory, and a solid-state drive (SSD). The external memory 23b may further include flash drive, for example, compact flash (CF), secure digital (SD), micro-SD, mini-SD, extreme Digital (xD), a multi-media card (MMC), or a memory stick. The external memory 234 may be functionally or physically connected with the electronic device 201 through various interfaces.

The sensor module 240 measures physical quantity or senses an operation state of the electronic device 201 to convert the measured or sensed information into an electric signal. The sensor module 240 may, for example, include at least one of a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., RGB sensor), a biometric sensor 240I, a temperature/humidity sensor 240J, an illumination sensor 240K, and a ultraviolet (UV) sensor 240M. Additionally or alternatively, the sensor module 240 may include an E-nose sensor (not shown), an electromyography (EMG) sensor (not shown), an electroencephalogram (EEG) sensor (not shown), an electrocardiogram (ECG) sensor (not shown), an infrared (IR) sensor, an iris sensor, and/or a fingerprint sensor. The sensor module 240 may further include a control circuit for controlling at least one sensor included therein. In some embodiment, the electronic device 201 may further include a processor configured to control the sensor module 240 as part of or separately from the processor 210, to control the sensor module 240 during a sleep state of the processor 210.

The input device 250 may include, for example, a touch panel 252, a (digital) pen sensor 254, a key 256, or an ultrasonic input device 258. The touch panel 252 may use at least one of a capacitive type, a resistive type, an IR type, or an ultrasonic type. The touch panel 252 may further include a control circuit. The touch panel 252 may further include a tactile layer to provide tactile reaction to the user. The (digital) pen sensor 254 may include a recognition sheet which is a part of the touch panel 252 or a separate recognition sheet. The key 256 may also include a physical button, an optical key, or a keypad. The ultrasonic input device 258 senses ultrasonic waves generated by an input means through a microphone (e.g., the microphone 288) and checks data corresponding to the sensed ultrasonic waves.

The display 260 (e.g., the display 160) may include a panel 262, a hologram device 264, a projector 266, and/or a control circuit for controlling them. The panel 262 may be implemented to be flexible, transparent, or wearable. The panel 262 may be configured with the touch panel 252 in one module. According to an embodiment, the panel 262 may include a pressure sensor (or a "force sensor", interchangeably used hereinafter) capable of measuring a strength of a pressure by a user's touch. The pressure sensor may be implemented integrally with the touch panel 252 or may be implemented as one or more sensors separate from the touch panel 252. The hologram device 264 may show a stereoscopic image in the air by using interference of light. The projector 266 may display an image onto a screen through projection of light. The screen may be positioned inside or outside the electronic device 201. The interface 270 may include an HDMI 272, a universal serial bus (USB) 274, an optical communication 276, or a D-subminiature 278. The interface 270 may be included in the communication interface 170 illustrated in FIG. 1. Additionally or alternatively, the interface 270 may include a mobile high-definition link (MHL) interface, an SD/multi-media card (MMC) interface, or an Infrared Data Association (IrDA) interface.

The audio module 280 may bi-directionally convert sound and an electric signal. At least one element of the audio module 280 may be included in the input/output interface 145 illustrated in FIG. 1. The audio module 280 may process sound information input or output through the speaker 282, the receiver 284, the earphone 286, or the microphone 288.

The camera module 291 is, for example, a device capable of capturing a still image or a moving image, and according to an embodiment, may include one or more image sensors (e.g., a front sensor or a rear sensor), a lens, an image signal processor (ISP), or a flash (e.g., an LED, a xenon lamp, etc.).

According to an embodiment, the camera module 291 may include the first camera module that obtains (or outputs) image data (e.g., an IR image) using IR light and the second camera module that obtains (or outputs) an optical signal and outputs image data (e.g., an RGB image). The first camera module may include an IR camera (e.g., an IR image sensor, a lens, and an image signal processor (ISP), etc.) and an IR LED, and the second camera module may include a front image sensor, a lens, an ISP, or a flash. According to various embodiments, the first camera module may include an IR camera and separately include an IR LED.

The power management module 295 manages power of the electronic device 201. According to an embodiment, the power management module 295 may include a power management integrated circuit (PMIC), a charger IC, or a battery fuel gauge. The PMIC may have a wired and/or wireless charging scheme. The wireless charging scheme may include a magnetic-resonance type, a magnetic induction type, and an electromagnetic type, and may further include an additional circuit for wireless charging, for example, a coil loop, a resonance circuit, or a rectifier. The battery gauge may measure the remaining capacity of the battery 296 or the voltage, current, or temperature of the battery 296 during charging. The battery 296 may include, for example, a rechargeable battery and/or a solar battery.

The indicator 297 displays a particular state, for example, a booting state, a message state, or a charging state, of the electronic device 201 or a part thereof (e.g., the processor 210). The motor 298 may convert an electric signal into mechanical vibration or generates vibration or a haptic effect. The electronic device 201 may include a device for supporting the mobile TV (e.g., a GPU) to process media data according to a standard such as digital multimedia broadcasting (DMB), digital video broadcasting (DVB), or mediaFlo™. Each of the foregoing elements described herein may be configured with one or more components, names of which may vary with a type of the electronic device. In various embodiments, some components of the electronic device (e.g., the electronic device 201) may be omitted or may further include other elements, and some of the components may be coupled to form one entity and identically perform functions of the components before being coupled.

Figure 3:
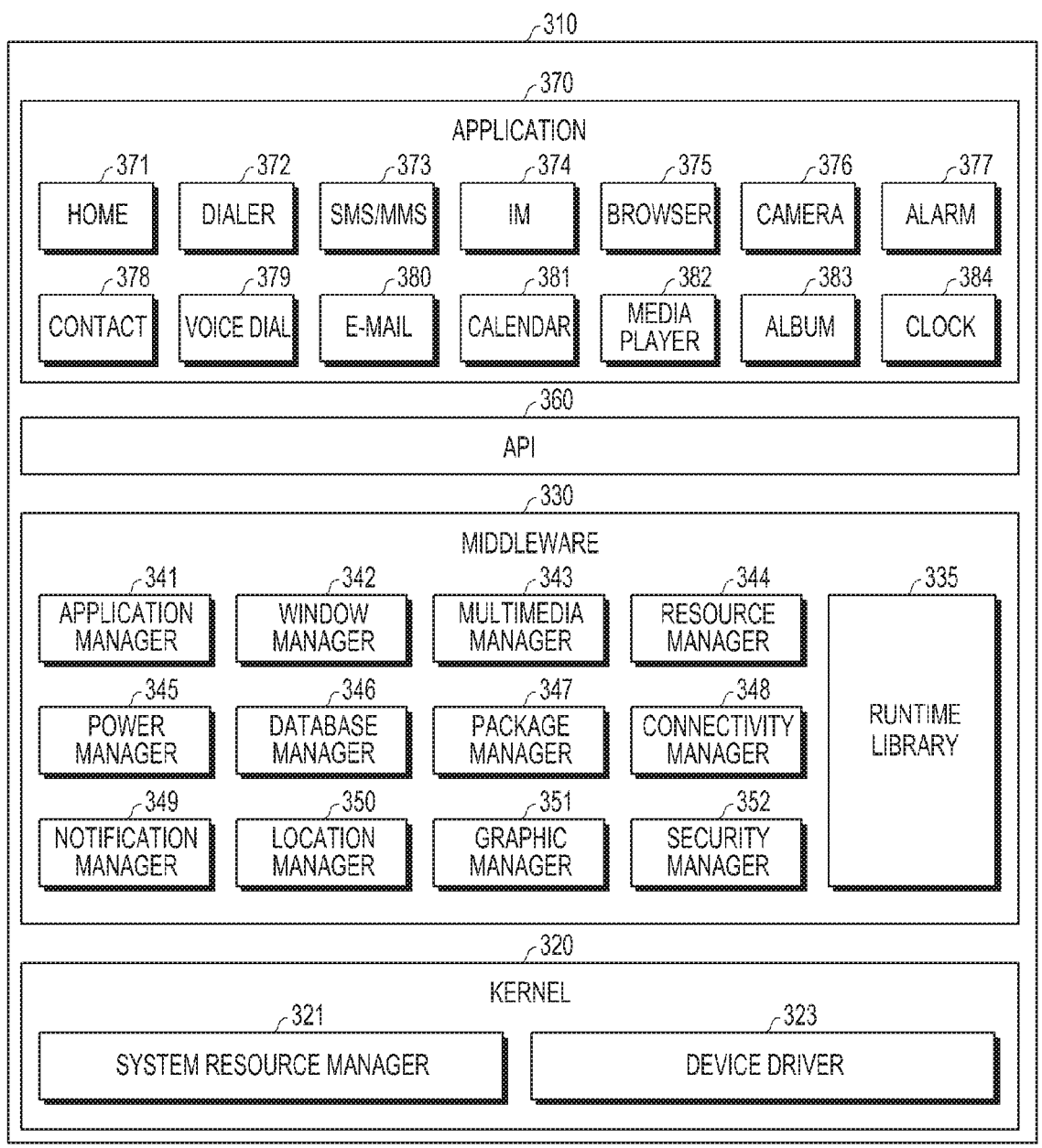
FIG. 3 is a block diagram of a programming module according to various embodiments.

FIG. 3 is a block diagram of a programming module according to various embodiments. According to an embodiment, a programming module 310 (e.g., the program 140) may include an OS for controlling resources associated with an electronic device (e.g., the electronic device 101) and/or various applications (e.g., the application program 147) executed on the OS. The OS may include Android™, iOS™, Windows™, Symbian™, Tizen™, or Bada™. Referring to FIG. 3, the programming module 310 may include a kernel 320 (e.g., the kernel 141), middleware 330 (e.g., the middleware 143), an application programming interface (API) 360 (e.g., the API 145), and/or an application 370 (e.g., the application program 147). At least a part of the programming module 310 may be preloaded on an electronic device or may be downloaded from an external device (e.g., the vehicle device 102, the electronic device 104, or the server 106).

The kernel 320 may include a system resource manager 321 and/or a device driver 323. The system resource manager 321 may perform control, allocation, retrieval of system resources, and so forth. According to an embodiment, the system resource manager 321 may include a process management unit, a memory management unit, or a file system management unit. The device driver 323 may include, for example, a display driver, a camera driver, a Bluetooth driver, a shared memory driver, a USB driver, a keypad driver, a WiFi driver, an audio driver, or an inter-process communication (IPC) driver. The middleware 330 may include provide functions that the application 370 commonly requires or provide various functions to the application 370 through the API 360 to allow the application 370 to use a limited system resource in an electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses to add a new function through a programming language while the application 370 is executed. The runtime library 335 performs input/output management, memory management, or calculation function processing. The application manager 341 manages a life cycle of the applications 370. The window manager 342 manages a graphic user interface (GUI) resource used in a screen. The multimedia manager 343 recognizes a format necessary for playing media files and performs encoding or decoding on a media file by using a codec appropriate for a corresponding format. The resource manager 344 manages a source code or a memory space of the applications 370. The power manager 345 manages a battery or power and provides power information necessary for an operation of the electronic device. According to an embodiment, the power manager 345 may operate with basic input/output system (BIOS). The database manager 346 generates, searches or changes a database used for at least one application among the applications 370. The package manager 347 manages the installation or update of an application distributed in a package file format.

The connectivity manager 348 manages a wireless connection. The notification manager 349 provides an event, e.g., an arriving message, an appointment, proximity notification, etc. The location manager 350 manages location information of an electronic device. The graphic manager 351 manages, for example, a graphic effect to be provided to a user or a user interface relating thereto. The security manager 352 provides, for example, system security or user authentication. According to an embodiment, the middleware 330 may further include a telephony manager for managing a voice or video call function of the electronic device or a middleware module forming a combination of functions of the above-described components. According to an embodiment, the middleware 330 provides a module specified for each type of an OS. Additionally, the middleware 330 may delete some of existing elements or add new elements dynamically. The API 360 may be provided as a set of API programming functions with a different configuration according to the OS. In the case of Android or iOS, for example, one API set may be provided by each platform, and in the case of Tizen, two or more API sets may be provided.

The application 370 may include one or more applications capable of providing a function, for example, a home application 371, a dialer application 372, a short messaging service/multimedia messaging service (SMS/MMS) application 373, an instant message (IM) application 374, a browser application 375, a camera application 376, an alarm application 377, a contact application 378, a voice dial application 379, an e-mail application 380, a calendar application 381, a media player application 382, an album application 383, a clock application 384, a health care application (e.g., an application for measuring an exercise amount, a blood sugar, etc.), or an environment information providing application (e.g., an application for providing air pressure, humidity, or temperature information or the like). According to an embodiment, the application 370 may include an information exchange application supporting information exchange between the electronic device and an external electronic device. The information exchange application may include, for example, a notification relay application for transferring specific information to the external electronic device or a device management application for managing the external electronic device. For example, the notification relay application may deliver notification information generated in another application of the electronic device to an external electronic device or may receive notification information from the external electronic device and provide the notification information to the user. The device management application may manage (e.g., install, remove, or update) a function (e.g., turn on/turn off of an external electronic device itself (or a part thereof) or control of brightness (or resolution) of a display) of an external device communicating with the electronic device, a service provided by an application operating in an external electronic device or provided by the external electronic device (e.g., a call service or a message service). According to an embodiment, the application 370 may include an application (e.g., device health care application of mobile medical equipment) designated according to an attribute of the external electronic device. According to an embodiment, the application 370 may include an application received from the external electronic device. The at least a part of the programming module 310 may be implemented (e.g., executed) by software, firmware, hardware (e.g., the processor 210), or a combination of two or more of them, and may include, for example, modules, programs, routines, sets of instructions, or processes for performing one or more functions.

Figure 4:
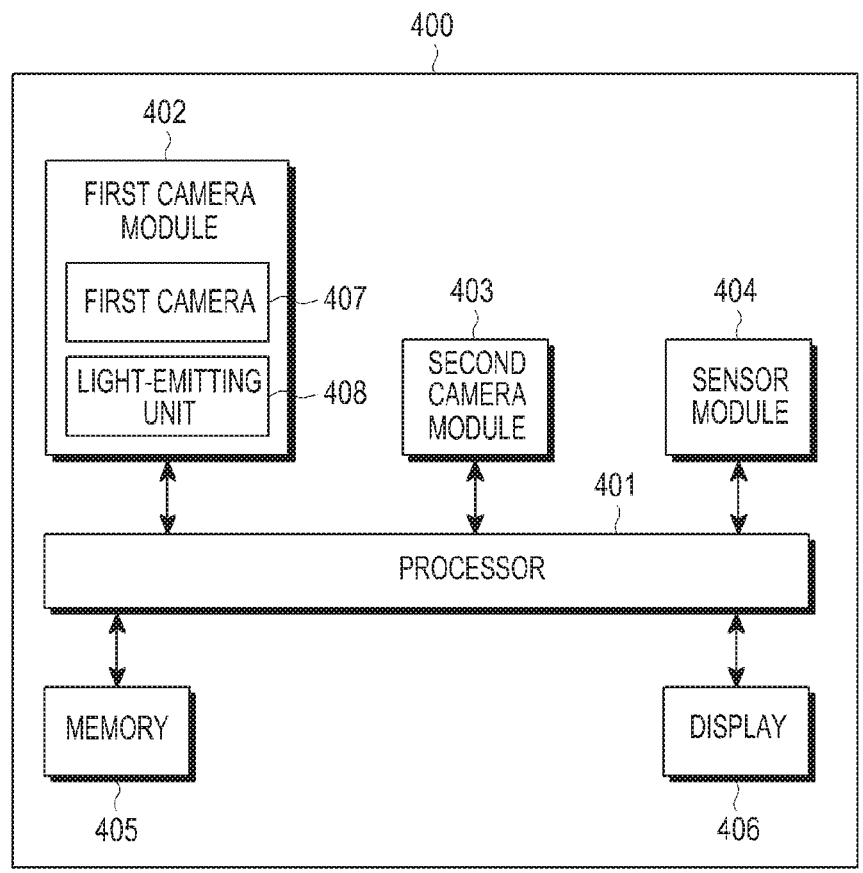
FIG. 4 is a block diagram of an electronic device according to various embodiments.

FIG. 4 is a block diagram of an electronic device according to various embodiments.

Referring to FIG. 4, an electronic device 400 may include a processor 401, a first camera module 402, a second camera module 403, a sensor module 404, a memory 405, and a memory 406. The first camera module 402 may include a first camera 407 (e.g., an IR camera) and a light-emitting unit 408 (e.g., an IR LED).

According to an embodiment, the processor 401 may activate the first camera module 402 for iris authentication. According to an embodiment, the processor 401 may activate the first camera module 402 upon the occurrence of an event for iris authentication. The iris authentication may be performed to release a lock screen, execute a particular application, or authenticate a user for use (or perform personal authentication).

According to an embodiment, the processor 401 may determine whether an object (e.g., a user, a face, an eye, etc.) is located within a first distance (or less) from the electronic device 400 (or the first camera module 402) by using a sensor module (e.g., a proximity sensor) 404.

When the object is located within the first distance, the processor 401 may deactivate the first camera module 402 and activate the second camera module 403. When the object is not located within the first distance, the processor 401 may perform iris authentication by using the first camera module 402. Since the first camera module 402 includes the IR LED that emits IR light and the IR camera that captures an IR image, exposure of light emitted from the IR LED to the eye of a user located within a particular distance (for a particular time) may cause damage such as blurred vision to the user. To avoid this, the processor 401 may prevent the eye from being damaged by the IR light by deactivating the IR LED of the first camera module 402. By deactivating both the IR LED and the IR camera of the first camera module 402, the processor 401 may prevent the eye from being damaged by the IR light and may reduce the power consumption of the electronic device 400.

According to an embodiment, the processor 401 may detect the object (e.g., the user, the face, or the eye, etc.) by analyzing image data output through the activated second camera module 403. For example, the processor 401 may activate the second camera module 403 as a background. According to various embodiments, the processor 401 may display the image data output through the activated second camera module 403 as a preview on the display 406. The preview, which is temporarily stored image data, may be displayed on the display 406 such that an image may be previously checked before the image is captured.

The processor 401 may calculate the distance between the object and the electronic device 400 by using the detected object. For example, the processor 401 may calculate the distance between the object and the electronic device 400 by using the distance in cm between the eyes, the width in pixels of a preview screen displayed on the display 406, the distance in pixels between the eyes in the preview screen, and the field of view (FoV) of the second camera module 403 (e.g., the RGB camera). The processor 401 may also calculate the distance between the object and the electronic device 400 by using the width in cm of the face, the width in pixels of the preview screen displayed on the display 406, the width in pixels of the face in the preview screen, and the FoV of the second camera module 403. For example, the distance in cm between the eyes may be calculated using widths in cm and in pixels of the display 406 or the preview screen or the FoV of the RGB camera.

According to an embodiment, the processor 401 may determine whether the calculated distance is greater than or equal to a second distance, and activate the first camera module 402 when the calculated distance is greater than or equal to the second distance. The processor 401 may perform iris authentication by using the activated first camera module 402. For example, the processor 401 may obtain iris information (e.g., an iris image, an iris pattern, etc.) by using the first camera module 402 and perform iris authentication based on the obtained iris information. According to various embodiments, the processor 401 may display the IR image output through the first camera module 402 as a preview on the display 406.

When the calculated distance is less than the second distance, the processor 401 may maintain the deactivated state of the first camera module 402.

According to various embodiments, the processor 401 may simultaneously, in parallel, or sequentially activate the first camera module 402 and the second camera module 403 for iris authentication. The processor 401 may simultaneously activate the first camera module 402 and the second camera module 403 or may activate the second camera module 403 earlier than the first camera module 402. The first camera module 402 and the second camera module 403 may mutually exclusively maintain activation/deactivation.

According to various embodiments, the processor 401 may activate the second camera module 403 for iris authentication and determine whether the object is detected from the image data output through the second camera module 403. For example, the processor 401 may activate the second camera module 403 in a low-energy photographing mode. The low-energy photographing mode may include a black/white image photographing mode, a low-resolution image photographing mode, etc.

Once the object is detected from the image data, the processor 401 may perform iris authentication by using the first camera module 402, when no object is detected from the image data, the processor 401 may stop (or terminate) iris authentication.

According to various embodiments, the processor 401 may activate the second camera module 403 for iris authentication and determine whether the object is detected from the image data output through the second camera module 403.

When the object is detected from the image data, the processor 401 may calculate the distance between the object and the electronic device 400 by using the detected object and determine whether the calculated distance is greater than or equal to the second distance. When the object is not detected from the image data, the processor 401 may maintain the deactivatestate [E1] of the first camera module 403 or stop (or terminate) iris authentication.

When the calculated distance is greater than or equal to the second distance, the processor 401 may perform iris authentication by using the first camera module 402, when the calculated distance is less than the second distance, the processor 401 may deactivate the first camera module 402. The processor 401 may continuously calculate the distance between the object and the electronic device 400 and determine whether the calculated distance is greater than or equal to the second distance.

According to various embodiments, the processor 401 may deactivate the first camera module 402 when the distance between the object and the electronic device 400 is greater than or equal to the second distance after the first camera module 402 is activated, or after a threshold time from the distance being greater than or equal to the second distance has elapsed. The threshold time may be a time in which eyes are not damaged by the IR light within a particular distance.

According to various embodiments, once the object is detected from the image data, the processor 401 may determine whether the object is located within the first distance by using the sensor module 404. When the object is located within the first distance, the processor 401 may deactivate the first camera module 402. For example, the processor 401 may deactivate the light-emitting unit 408 of the first camera module 402 or deactivate both the light-emitting unit 408 and the first camera 407.

When the object is not located within the first distance, the processor 401 may calculate the distance between the object and the electronic device 400 by using the second camera module 403 and determine whether the calculated distance is greater than or equal to the second distance. When the calculated distance is greater than or equal to the second distance, the processor 401 may activate the first camera module 402 and perform iris authentication by using the activated first camera module 402. When the calculated distance is less than the second distance, the processor 401 may maintain the deactivated state of the first camera module 402.

According to various embodiments, the processor 401 may activate the first camera module 402 and the second camera module 403 for iris authentication and determine whether the object is detected from the image data output through the second camera module 403. When the object is detected from the image data, the processor 401 may calculate the distance between the object and the electronic device 400 by using the image data and determine whether the calculated distance is greater than or equal to the second distance. When the object is not detected from the image data, the processor 401 may deactivate the first camera module 402.

When the calculated distance is greater than or equal to the second distance, the processor 401 may perform iris authentication by using the first camera module 402. For example, the processor 401 may emit light through the IR LED of the first camera module 402 and obtain the IR image through the IR camera of the first camera module 402. The processor 401 may detect iris information (e.g., an iris image, an iris pattern, etc.) from the iris image obtained through the IR camera, compare the detected iris information with previously stored iris information, and complete or fail iris authentication according to whether the detected iris information is identical to the previously stored iris information. When the calculated distance is less than the second distance, the processor 401 may deactivate the first camera module 402. According to various embodiments, the processor 401 may deactivate the IR LED or both of the IR camera and the IR LED when the iris information is not detected from the IR image obtained using the IR camera.

According to various embodiments, the processor 401 may continuously determine whether the distance between the object and the electronic device 400, calculated using the second camera module 403 in the deactivated state of the first camera module 402, is greater than or equal to the second distance.

According to various embodiments, the processor 401 may continuously determine whether the object is located within the first distance by using the sensor module 404 in the deactivated state of the first camera module 402.

According to various embodiments, the processor 401 may activate the first camera module 402 and the second camera module 403, determine whether the object is located within the first distance through the sensor module 404, and deactivate the first camera module 402 when the object is located within the first distance. When the object is not located within the first distance, the processor 401 may perform iris authentication by using the first camera module 402.

The processor 401 may calculate the distance between the object and the electronic device 400 by using the second camera module 403, determine whether the calculated distance is greater than or equal to the second distance, activate the first camera module 402, and perform iris authentication when the calculated distance is greater than or equal to the second distance. When the calculated distance is less than the second distance, the processor 401 may maintain the deactivated state of the first camera module 402.

According to various embodiments, the processor 401 may continuously determine whether the distance between the object and the electronic device 400, calculated using the second camera module 403 in the deactivated state of the first camera module 402, is greater than or equal to the second distance.

According to various embodiments, the processor 401 may activate the first camera module 402 and the second camera module 403 for iris authentication and obtain the iris information (e.g., the iris image, the iris pattern, etc.) by using the first camera module 402. The processor 401 may determine whether the object is located within the first distance and deactivate the first camera module 402 when the object is located within the first distance. When the object is not located within the first distance, the processor 401 may perform iris authentication by using the iris information obtained through the first camera module 402.

The processor 401 may calculate the distance between the object and the electronic device 400 by using the second camera module 403 and determine whether the calculated distance is greater than or equal to the second distance. When the calculated distance is greater than or equal to the second distance, the processor 401 may activate the first camera module 402. The processor 401 may obtain the iris information by using the first camera module 402 and perform iris authentication based on the obtained iris information.

According to various embodiments, the processor 401 may display a lock screen that requires user authentication on the display 406 and activate an RGB camera (e.g., a front camera (located on a front surface)) of the electronic device 400, which obtains image data, and an IR camera that obtains an IR image, upon the occurrence of an event for user authentication. The processor 401 may determine whether the object is detected from the image data output through the RGB camera and activate the IR LED when the object is detected from the image data. The processor 401 may perform iris authentication by using the IR camera and the IR LED. For example, the processor 401 may obtain iris information by using the IR camera and the IR LED, compare the obtained iris information with previously stored iris information, and succeed or fail iris authentication according to whether the obtained iris information is identical to the previously stored iris information. When iris authentication succeeds, the processor 401 may deactivate the IR camera and the IR LED and release the lock screen. According to various embodiments, the processor 401 may deactivate the IR LED or both of the IR camera and the IR LED when the iris information is not obtained from the IR image obtained using the IR camera.

According to various embodiments, for iris authentication, the processor 401 may determine whether the object is located within the first distance through a sensor module 404 and deactivate the light-emitting unit 408 of the first camera module 402 or both the first camera 407 and the light-emitting unit 408 of the first camera module 402 when the object is located within the first distance. The processor 401 may calculate the distance between the object and the electronic device 400 by using the second camera module 403 and activate the light-emitting unit 408 or both the first camera 407 and the light-emitting unit 408 when the calculated distance is greater than or equal to the second distance. The processor 401 may perform iris authentication by using the first camera 407 and the light-emitting unit 408.

According to various embodiments, the processor 401 may activate the second camera module 403 to output image data upon the occurrence of the event for iris authentication, and may determine an object (e.g., a face) from the image data. The processor 401 may determine a skin color from the detected face and determine a reflectivity threshold value corresponding to the first distance based on the determined skin color. For example, the processor 401 may define a spectrum range for the reflectivity of the sensor module 404 corresponding to various skin colors such as white, yellow, black, etc., and a reflectivity threshold value corresponding to the spectrum range. Due to their bright skin color, white people have a higher reflectivity threshold value than yellow or black people, and due to their dark skin color, black people have a lower reflectivity threshold value than the white or yellow people. When white, yellow, and black people are located at the same first distance, the reflectivity threshold values, respectively for white people, yellow people, and black people, corresponding to the first distance, may be different from one another. For example, when a reflectivity threshold value for a first skin color corresponding to the first distance is 150, a reflectivity threshold value for a second skin color corresponding to the first distance is 200, and a reflectivity threshold value for a third skin color corresponding to the first distance is 320, then the processor 401 may activate the second camera module 403 upon the occurrence of the event for iris authentication. The processor 401 may detect a user's skin color by using the second camera module 403. When the detected user's skin color is the second skin color, the processor 401 may determine a reflectivity threshold value for the user through the sensor module 404 and determine that the user is located within the first distance when the determined reflectivity threshold value is equal to or less than 200. Thus, based on the user's skin color, the accuracy of proximity (or location) with respect to the sensor module 404 may be improved.

According to various embodiments, a threshold distance, a first time, and a second time may be set arbitrarily and are not limited to a particular distance (e.g., 1.5 cm) or a particular time (e.g., 10 seconds), and may be set to various distances or times.

According to various embodiments, the processor 401 may output guide information (e.g., contents such as a text, an image, voice, a moving image, and so forth) to guide the distance between the object and the electronic device 400 for iris authentication. For example, the processor 401 may display a phrase like "too close to the camera" on the display 406.

The first camera module 402 may include the first camera 407 (e.g., an IR camera) and the light-emitting unit 408 (e.g., an IR LED) for iris authentication. The light-emitting unit 408 may output IR light, and the first camera 407 may obtain an IR image. According to various embodiments, the first camera module 402 may include the first camera 407, and the light-emitting unit 408 may be separately provided outside the first camera module 402.

The second camera module 403 may include a second camera (e.g., an RGB camera) that receives a light signal and outputs image data.

The sensor module 404 may include a proximity sensor that senses the proximity of an object, and the proximity sensor may determine whether the object is located within the first distance.

The memory 405 may store all data used for iris authentication. For example, the memory 405 may store iris information (e.g., an iris image, an iris pattern, etc.) regarding at least one object for iris authentication.

The display 406 may display image data output from the first camera module 402 or the second camera module 403. For example, the display 406 may display a preview screen for IR image data output through the first camera module 402 or a preview screen for RGB image data output through the second camera module 403.

Figure 5A:
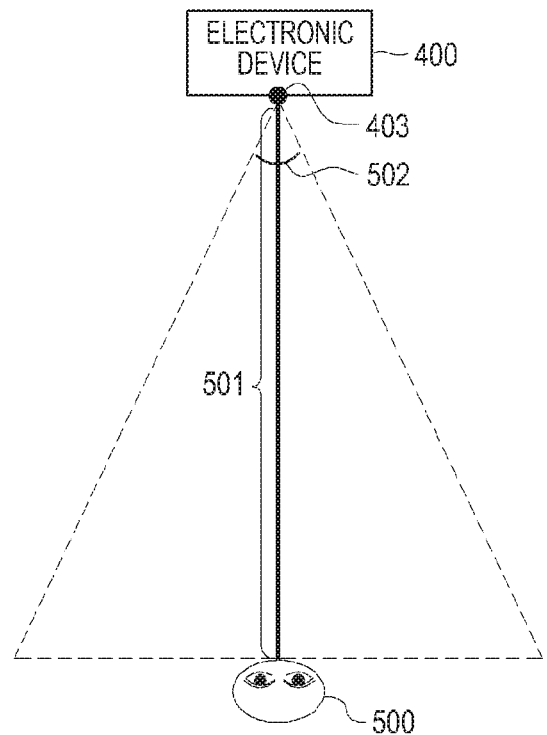
FIGS. 5A and 5B are diagrams for describing a method for calculating a distance between an object and an electronic device according to various embodiments.
Figure 5B:
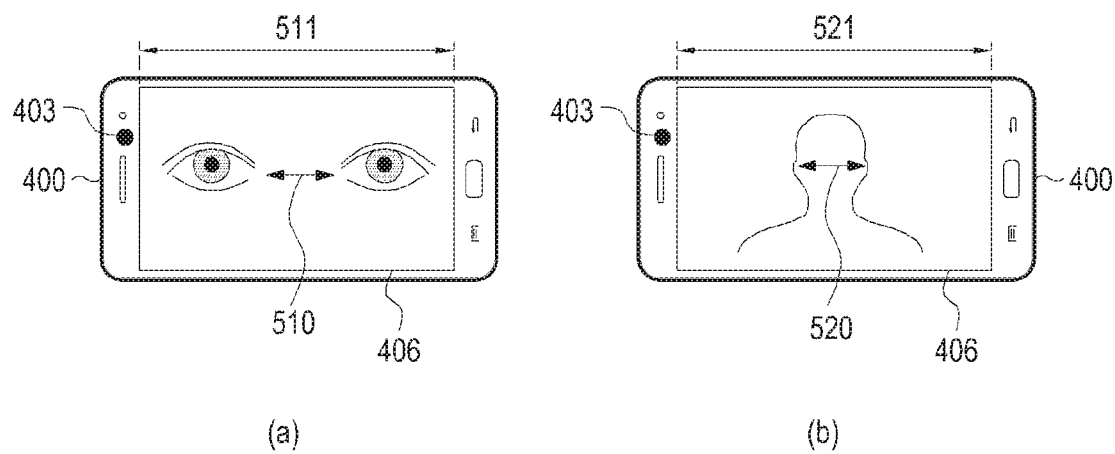

FIGS. 5A and 5B are diagrams for describing a method for calculating the distance between an object and an electronic device according to various embodiments.

Referring to FIGS. 5A and 5B, to calculate the distance 501 between an object 500 and the electronic device 400, the electronic device 400 (e.g., the processor 401) may calculate the distance d between the object 500 and the electronic device 400 as expressed in [Equation 1] by using the distance in cm, d1, between eyes detected from image data, the width in pixels, d2 or 511, of a preview screen displayed on the display 406, the distance in pixels, d3 or 510, between the eyes on the preview screen, and an FoV 502 of the second camera module 403.

$$d = \frac{d_1 \times d_2}{d_3 \times \tan\left(\frac{fov}{2}\right) \times 2} \qquad \text{[Equation 1]}$$

According to various embodiments, to calculate the distance 501 between the object 500 and the electronic device 400, the electronic device 400 (e.g., the processor 401) may calculate the distance d between the object 500 and the electronic device 400 as expressed in [Equation 2] by using the distance in cm, d4, of a face detected from the image data, the width in pixels, d5 or 521, of the preview screen displayed on the display 406, the distance in pixels, d6 or 520, of the face on the preview screen, and the FoV 502 of the second camera module 403.

$$d = \frac{d_4 \times d_5}{d_6 \times \tan\left(\frac{fov}{2}\right) \times 2} \qquad \text{[Equation 2]}$$

Figure 6:
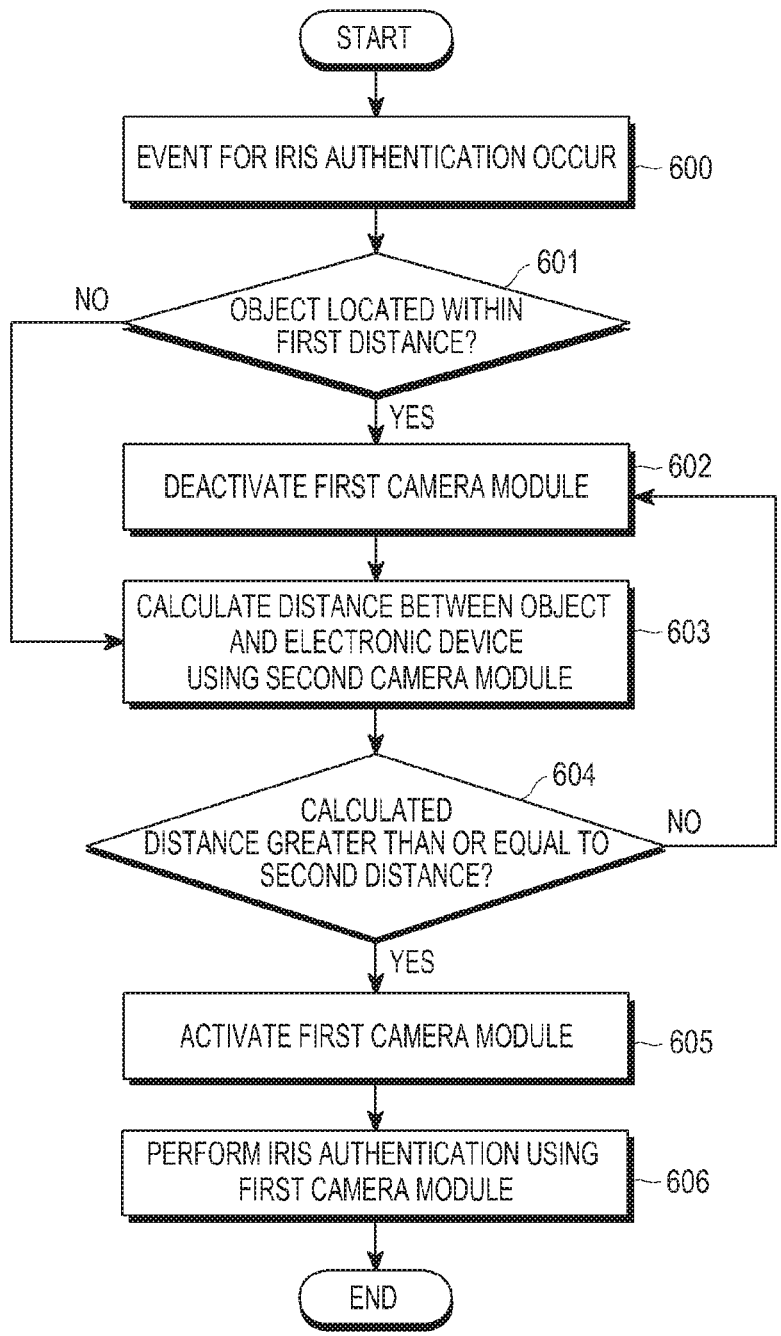
FIG. 6 is a flowchart for performing iris authentication in an electronic device according to various embodiments.

FIG. 6 is a flowchart for performing iris authentication in an electronic device according to various embodiments.

According to various embodiments, operations 600 through 606 may be performed by any one of the electronic device 101, 102, 104, 201, or 400, the server 106, the processor 120, 210, or 401, and the programming module 310.

Referring to FIG. 6, once the event for iris authentication occurs in operation 600, the electronic device 400 (e.g., the processor 401) may determine whether the object is located within the first distance by using the sensor module 404 in operation 601.

When the object is located within the first distance, the electronic device 400 (e.g., the processor 401) may deactivate the first camera module 402 in operation 602. For example, the electronic device 400 (e.g., the processor 401) may deactivate the first camera module 402 in the activated state or maintain the deactivated state of the first camera module. According to various embodiments, the electronic device 400 (e.g., the processor 401) may deactivate the light-emitting unit 408 of the first camera module 402 or deactivate both the first camera 407 and the light-emitting unit 408.

When the object is not located within the first distance or the first camera module 402 is deactivated, the electronic device 400 (e.g., the processor 401) may calculate the distance between the object and the electronic device 400 by using the second camera module 403. For example, the electronic device 400 (e.g., the processor 401) may calculate the distance between the user and the electronic device 400.

The electronic device 400 (e.g., the processor 401) may determine in operation 604 whether the calculated distance is greater than or equal to the second distance, and activate the first camera module 402 in operation 605 when the calculated distance is greater than or equal to the second distance.

When the calculated distance is less than the second distance, the electronic device 400 (e.g., the processor 401) may deactivate the first camera module 402 in operation 602 and perform operations 603 through 606. For example, the electronic device 400 (e.g., the processor 401) may maintain the deactivated state of the first camera module 402 when the first camera module 402 is deactivated.

In operation 606, the electronic device 400 (e.g., the processor 401) may perform iris authentication by using the first camera module 402. For example, the electronic device 400 (e.g., the processor 401) may obtain the iris information by using the first camera module 402 and perform iris authentication based on the obtained iris information.

Figure 7:
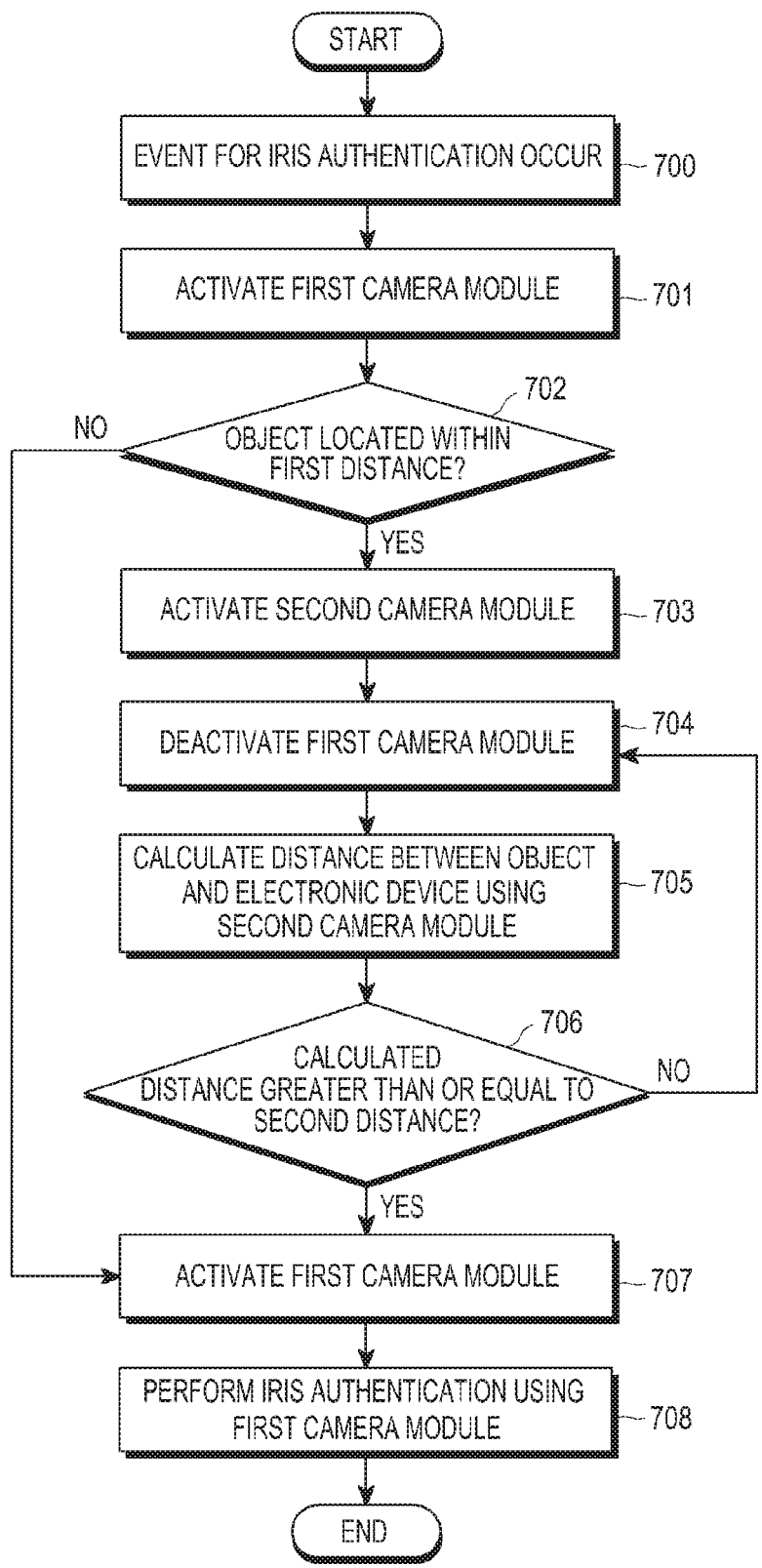
FIG. 7 is a flowchart for performing iris authentication in an electronic device according to various embodiments.

FIG. 7 is a flowchart for performing iris authentication in an electronic device according to various embodiments.

According to various embodiments, operations 700 through 708 may be performed by any one of the electronic device 101, 102, 104, 201, or 400, the server 106, the processor 120, 210, or 401, and the programming module 310.

Referring to FIG. 7, when the event for iris authentication occurs in operation 700, the electronic device 400 (e.g., the processor 401) may activate the first camera module 402 in operation 701.

The electronic device 400 (e.g., the processor 401) may determine in operation 702 whether the object is located within the first distance by using the sensor module 404, perform operation 703 when the object is located within the first distance, and perform operation 707 when the object is not located within the first distance.

The electronic device 400 (e.g., the processor 401) may activate the second camera module 403 in operation 703 and deactivate the first camera module 402 in operation 704. For example, the electronic device 400 (e.g., the processor 401) may deactivate the light-emitting unit 408 of the first camera module 402 or deactivate both the first camera 407 and the light-emitting unit 408.

In operation 705, the electronic device 400 (e.g., the processor 401) may calculate the distance between the object and the electronic device 400 by using the second camera module 403.

The electronic device 400 (e.g., the processor 401) may determine in operation 706 whether the calculated distance is greater than or equal to the second distance, perform operation 707 when the calculated distance is greater than or equal to the second distance, and perform operation 704 to deactivate the first camera module 402 and perform operations 705 through 708 when the calculated distance is less than the second distance.

In operation 707, the electronic device 400 (e.g., the processor 401) may activate the first camera module 402.

In operation 708, the electronic device 400 (e.g., the processor 401) may perform iris authentication by using the first camera module 402.

Figure 8:
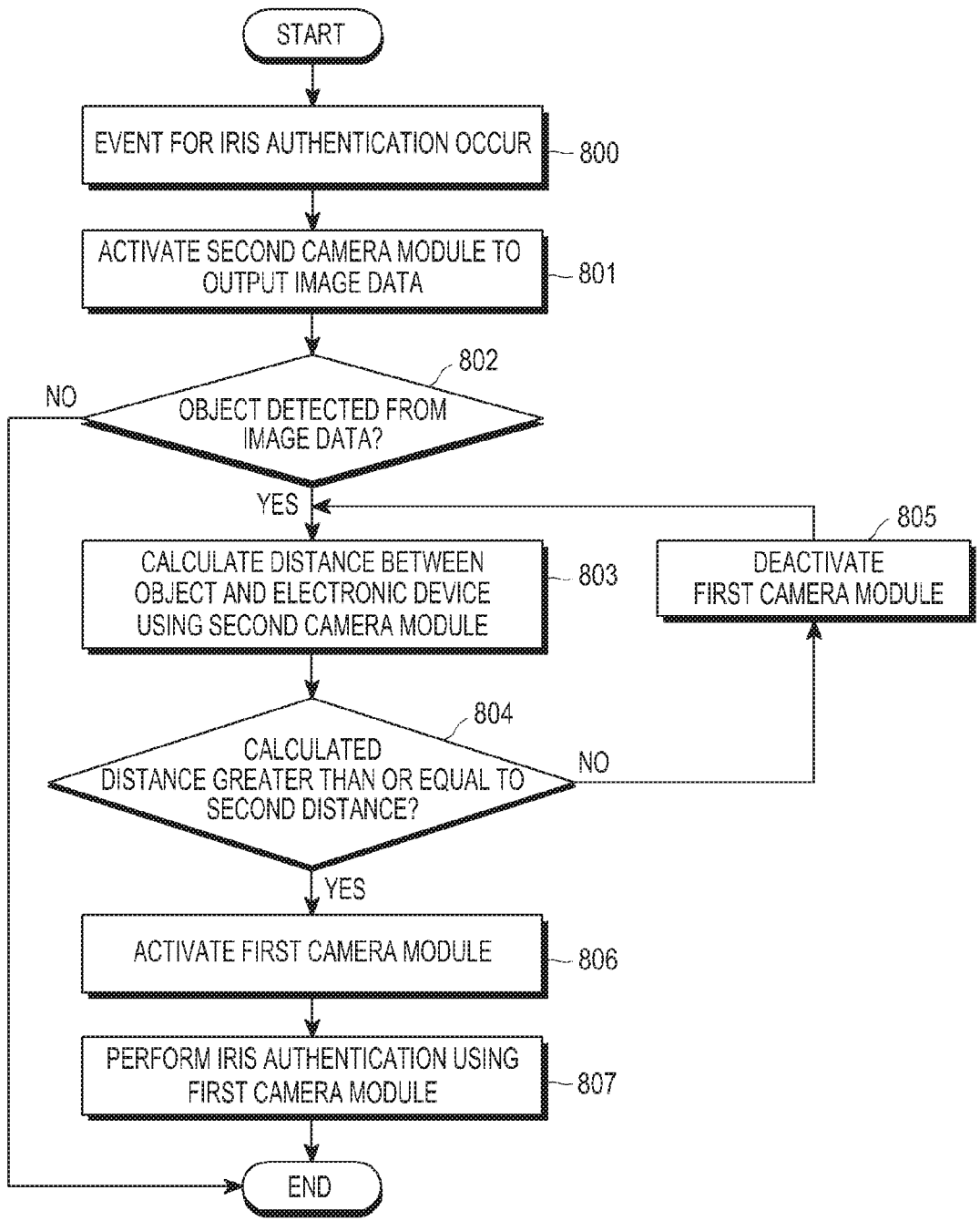
FIG. 8 is a flowchart for performing iris authentication in an electronic device according to various embodiments.

FIG. 8 is a flowchart for performing iris authentication in an electronic device according to various embodiments.

According to various embodiments, operations 800 through 807 may be performed by any one of the electronic device 101, 102, 104, 201, or 400, the server 106, the processor 120, 210, or 401, and the programming module 310.

Referring to FIG. 8, when the event for iris authentication occurs in operation 800, the electronic device 400 (e.g., the processor 401) may activate the second camera module 403 to output image data in operation 801.

The electronic device 400 (e.g., the processor 401) may determine in operation 802 whether the object is detected from the image data, perform operation 803 when the object is detected from the image data, and terminate iris authentication when the object is not detected from the image data. According to various embodiments, the electronic device 400 (e.g., the processor 401) may deactivate the first camera module 402.

In operation 803, the electronic device 400 (e.g., the processor 401) may calculate the distance between the object and the electronic device 400 by using the second camera module 403.

The electronic device 400 (e.g., the processor 401) may determine in operation 804 whether the calculated distance is greater than or equal to the second distance, perform operation 806 when the calculated distance is greater than or equal to the second distance, and perform operation 805 when the calculated distance is less than the second distance.

The electronic device 400 (e.g., the processor 401) may deactivate the first camera module 402 in operation 805, perform operation 803 to calculate the distance between the object and the electronic device 400 by using the second camera module 403, and perform operations 804 through 807.

In operation 806, the electronic device 400 (e.g., the processor 401) may activate the first camera module 402.

In operation 807, the electronic device 400 (e.g., the processor 401) may perform iris authentication by using the first camera module 402.

Figure 9:
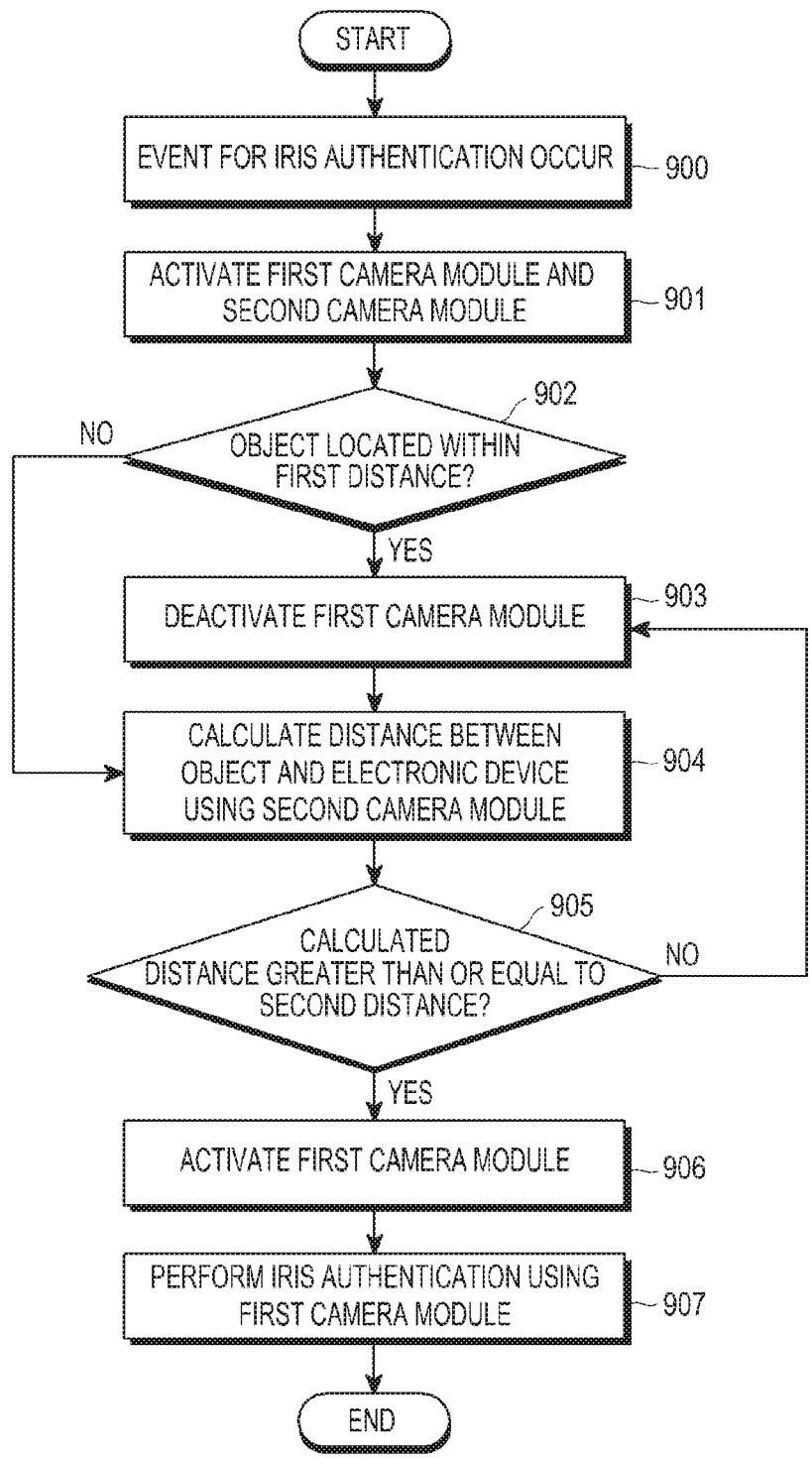
FIG. 9 is a flowchart for performing iris authentication in an electronic device according to various embodiments.

FIG. 9 is a flowchart for performing iris authentication in an electronic device according to various embodiments.

According to various embodiments, operations 900 through 907 may be performed by any one of the electronic device 101, 102, 104, 201, or 400, the server 106, the processor 120, 210, or 401, and the programming module 310.

Referring to FIG. 9, when the event for iris authentication occurs in operation 900, the electronic device 400 (e.g., the processor 401) may activate the first camera module 402 and the second camera module 403 in operation 901.

The electronic device 400 (e.g., the processor 401) may determine in operation 902 whether the object is located within the first distance by using the sensor module 404, perform operation 903 when the object is located within the first distance, and perform operation 904 when the object is not located within the first distance.

In operation 903, the electronic device 400 (e.g., the processor 401) may activate the first camera module 402. For example, the electronic device 400 (e.g., the processor 401) may deactivate the light-emitting unit 408 of the first camera module 402 or deactivate both the first camera 407 and the light-emitting unit 408.

In operation 904, the electronic device 400 (e.g., the processor 401) may calculate the distance between the object and the electronic device 400 by using the second camera module 403.

The electronic device 400 (e.g., the processor 401) may determine in operation 905 whether the calculated distance is greater than or equal to the second distance, perform operation 906 when the calculated distance is greater than or equal to the second distance.

When the calculated distance is less than the second distance, the electronic device 400 (e.g., the processor 401) may perform operation 903 to deactivate the first camera module 402 in operation 903 and perform operations 904 through 907.

In operation 906, the electronic device 400 (e.g., the processor 401) may activate the first camera module 402.

In operation 907, the electronic device 400 (e.g., the processor 401) may perform iris authentication by using the first camera module 402.

Figure 10:
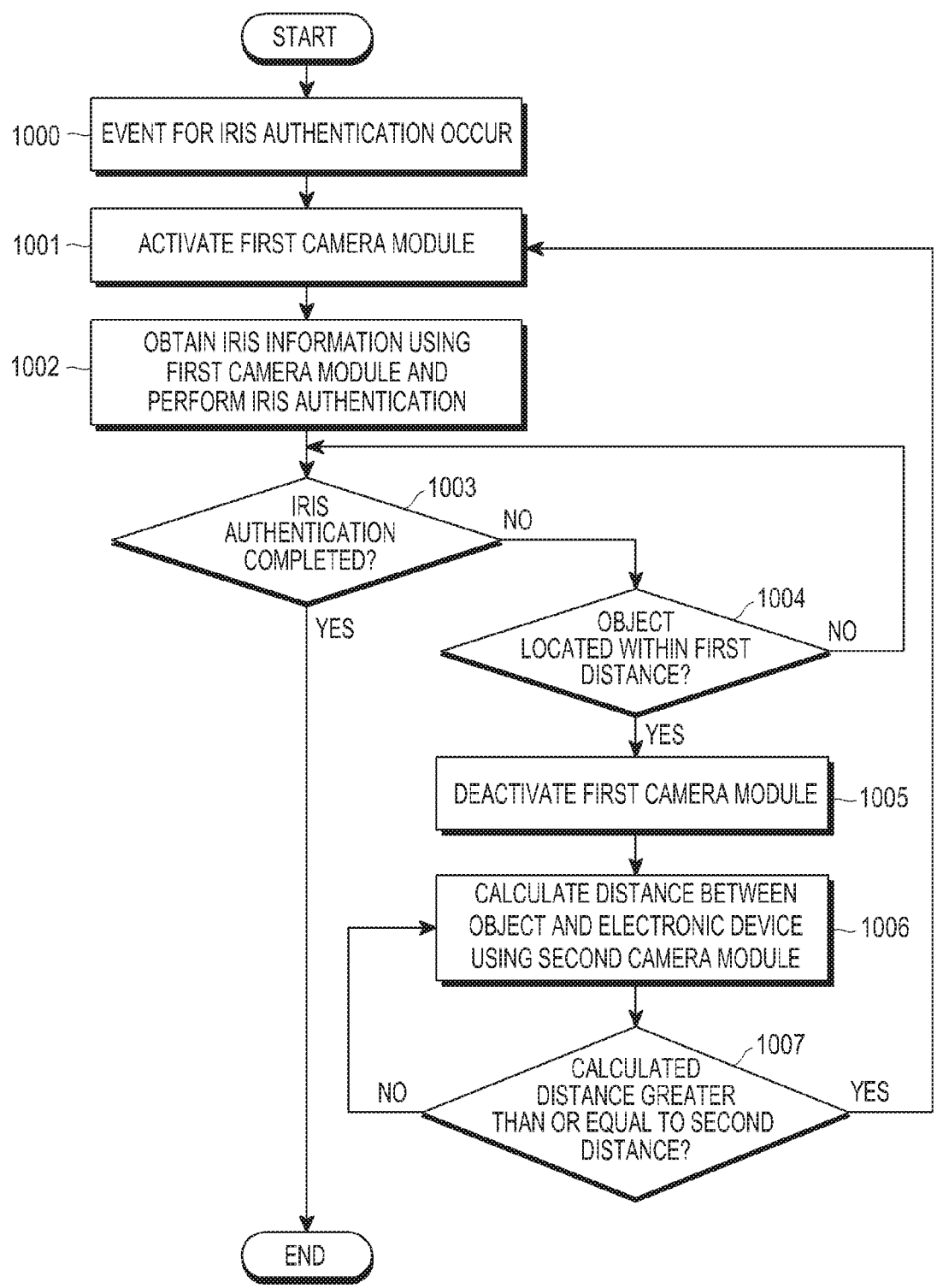
FIG. 10 is a flowchart for performing iris authentication in an electronic device according to various embodiments.

FIG. 10 is a flowchart for performing iris authentication in an electronic device according to various embodiments.

According to various embodiments, operations 1000 through 1007 may be performed by any one of the electronic device 101, 102, 104, 201, or 400, the server 106, the processor 120, 210, or 401, and the programming module 310.

Referring to FIG. 10, when the event for iris authentication occurs in operation 1000, the electronic device 400 (e.g., the processor 401) may activate the first camera module 402 in operation 1001.

In operation 1002, the electronic device 400 (e.g., the processor 401) may perform iris authentication by obtaining iris information with the first camera module 402. For example, the electronic device 400 (e.g., the processor 401) may detect the iris information from an IR image output through the first camera module 402 and perform iris authentication based on the obtained iris information.

The electronic device 400 (e.g., the processor 401) may determine in operation 1003 whether iris authentication is completed, terminate operations for iris authentication upon completion of iris authentication, and perform operation 1004 unless iris authentication is not completed.

The electronic device 400 (e.g., the processor 401) may determine in operation 1004 whether the object is located within the first distance by using the sensor module 404, perform operation 1005 when the object is located within the first distance, and perform operation 1003 to determine whether iris authentication is completed when the object is not located within the first distance.

In operation 1005, the electronic device 400 (e.g., the processor 401) may activate the first camera module 402. For example, the electronic device 400 (e.g., the processor 401) may deactivate the light-emitting unit 408 of the first camera module 402 or deactivate both the first camera 407 and the light-emitting unit 408.

In operation 1006, the electronic device 400 (e.g., the processor 401) may calculate the distance between the object and the electronic device 400 by using the second camera module 403.

The electronic device 400 (e.g., the processor 401) may determine in operation 1007 whether the calculated distance is greater than or equal to the second distance, and perform operation 1001 to activate the first camera module 402 and perform operations 1002 through 1007 when the calculated distance is greater than or equal to the second distance.

When the calculated distance is less than the second distance, the electronic device 400 (e.g., the processor 401) may perform operation 1006 to calculate the distance between the object and the electronic device 400 by using the second camera module 403, and perform operations 1003 through 1007.

Figure 11:
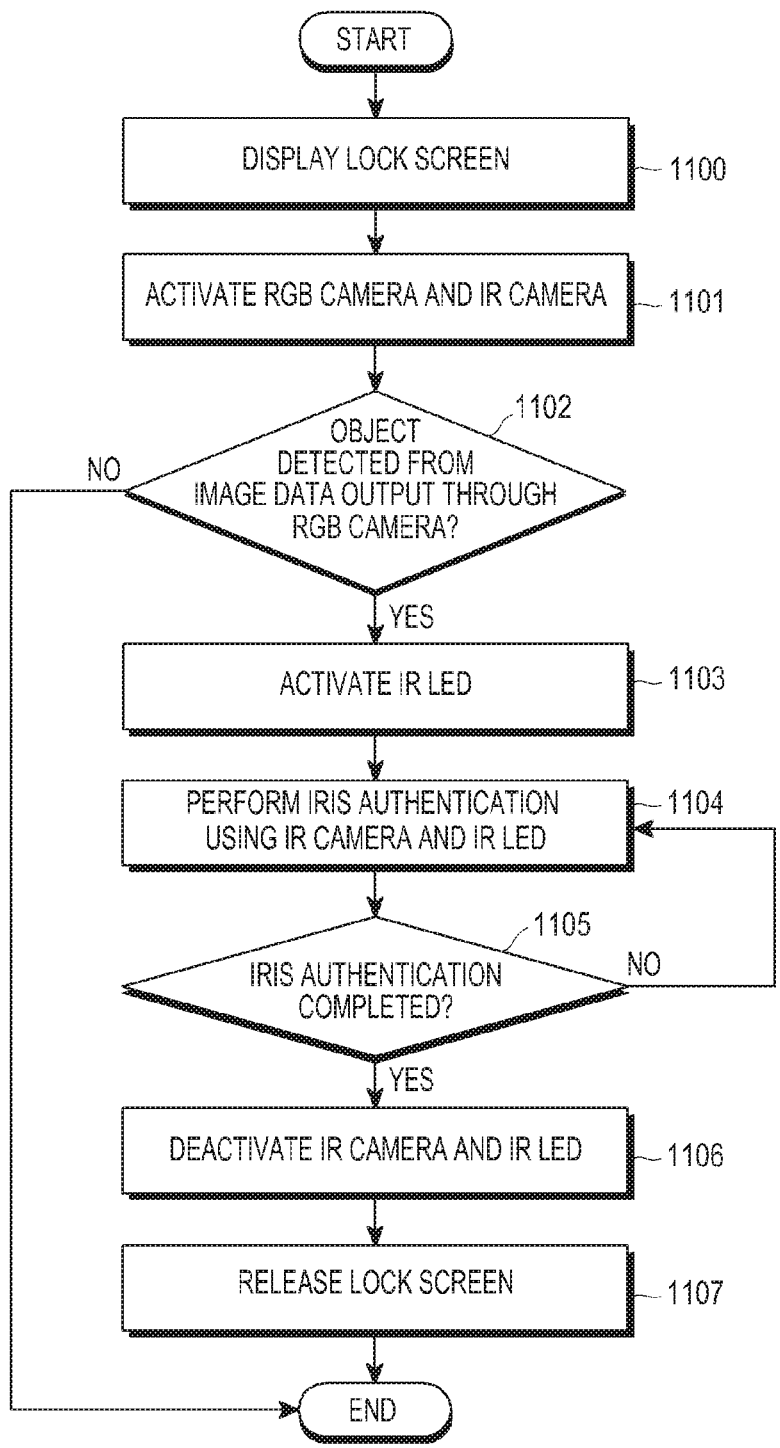
FIG. 11 is a flowchart for performing iris authentication in an electronic device according to various embodiments.

FIG. 11 is a flowchart for performing iris authentication in an electronic device according to various embodiments.

According to various embodiments, operations 1100 through 1107 may be performed by any one of the electronic device 101, 102, 104, 201, or 400, the server 106, the processor 120, 210, or 401, and the programming module 310.

Referring to FIG. 11, the electronic device 400 (e.g., the processor 401) may display the lock screen on the display 406 in operation 1100, and activate the RGB camera (the front camera) of the second camera module 403 and the IR camera of the first camera module 402 in operation 1101.

The electronic device 400 (e.g., the processor 401) may determine in operation 1102 whether the object is detected from the image data output through the RGB camera, perform operation 1103 when the object is detected from the image data, and terminate operations for iris authentication when the object is not detected from the image data.

The electronic device 400 (e.g., the processor 401) may activate the IR LED in operation 1103, and perform iris authentication by using the IR camera and the IR LED in operation 1104. For example, the electronic device 400 (e.g., the processor 401) may emit light through the IR LED, and obtain the IR image through the IR camera. When the iris information is detected from the obtained IR image, the electronic device 400 (e.g., the processor 401) may compare the detected iris information with the previously stored iris information, and complete or fail iris authentication depending on whether the detected iris information is identical to the previously stored iris information.

The electronic device 400 (e.g., the processor 401) may determine in operation 1105 whether iris authentication is completed, perform operation 1106 when iris authentication is completed, and perform iris authentication using the IR camera and the IR LED in operation 1104 and perform operations 1105 through 1107 when iris authentication is not completed.

The electronic device 400 (e.g., the processor 401) may deactivate the IR camera and the IR LED in operation 1106, and release the lock screen in operation 1107.

As such, according to various embodiments, the present disclosure may activate or deactivate an infrared camera and an infrared LED, which affect a user's vision, based on the distance between the user and the electronic device, thereby safely protecting the user's vision and facilitating iris authentication.

A term "module" used herein may mean, for example, a unit including one of or a combination of two or more of hardware, software, and firmware, and may be used interchangeably with terms such as logic, a logic block, a part, or a circuit. The "module" may be a part configured integrally, a minimum unit or a portion thereof performing one or more functions. The "module" may be implemented mechanically or electronically, and may include an application-specific integrated circuit (ASIC) chip, field-programmable gate arrays (FPGAs), and a programmable-logic device performing certain operations already known or to be developed. At least a part of an apparatus (e.g., modules or functions thereof) or a method (e.g., operations) according to various embodiments may be implemented with an instruction stored in a computer-readable storage medium (e.g., the memory 130) in the form of a programming module. When the instructions are executed by a processor (for example, the processor 120), the processor may perform functions corresponding to the instructions. The computer-readable recording medium includes hard disk, floppy disk, or magnetic media (e.g., a magnetic tape, optical media (e.g., compact disc read only memory (CD-ROM) or digital versatile disc (DVD), magneto-optical media (e.g., floptical disk), an embedded memory, and so forth. The instructions may include a code generated by a compiler or a code executable by an interpreter. Modules or programming modules according to various embodiments of the present disclosure may include one or more of the foregoing elements, have some of the foregoing elements omitted, or further include additional other elements. Operations performed by the module, the program, or another component according to various embodiments may be carried out sequentially, in parallel, repeatedly, or heuristically, or one or more of the operations may be executed in a different order or omitted, or one or more other operations may be added.

What is claimed is:

1. An electronic device comprising:
   a sensor comprising a proximity sensor;
   a first camera module comprising a first camera which is an infrared camera and a light-emitting unit which emits an infrared light;
   a second camera module comprising a second camera which is an RGB (red/green/blue) camera; and
   a processor electrically connected with the sensor, the first camera module, and the second camera module,
   wherein the processor is configured to:
      determine, using the sensor, whether an object is located within a first distance from the electronic device;
      control to deactivate the light-emitting unit or both the first camera and the light-emitting unit, based on determining that the object is located within the first distance from the electronic device;
      determine, based on an image of the object acquired using the second camera module, a distance between the object and the electronic device; and
      based on the determined distance being greater than or equal to a second distance between the object and the electronic device, the second distance being longer than the first distance:
         control to activate the light-emitting unit or both the light-emitting unit and first camera,
         acquire an image of an iris of the object using the light-emitting unit and the first camera, and
         perform, based on the image of the iris, iris authentication.

2. The electronic device of claim 1, wherein the processor is further configured to activate the first camera module and perform iris authentication using the first camera module, based on determining that the object is not located within the first distance from the electronic device.

3. The electronic device of claim 1, wherein the processor is further configured to deactivate the first camera module upon elapse of a threshold time from when the first camera module is activated and the object is detected using the second camera module.

4. The electronic device of claim 1, wherein the processor is further configured to activate the second camera module, determine whether the object is detected from image data output through the second camera module, and activate the first camera module based on detecting the object.

5. The electronic device of claim 4, wherein the processor is further configured to deactivate the first camera module based on the object not being detected from the image data.

6. The electronic device of claim 1, wherein the processor is further configured to activate the first camera module and the second camera module, and to deactivate the second camera module based on determining, using the sensor, that the object is located within the first distance from the electronic device.

7. The electronic device of claim 6, wherein the processor is further configured to perform iris authentication using the second camera module based on the object not being located within the first distance from the electronic device.

8. A non-transitory computer-readable storage medium having stored therein instructions that cause, when executed by at least one processor of an electronic device, the at least one processor to perform at least one operation comprising:
- determining, using a sensor comprising a proximity sensor, whether an object is located within a first distance from the electronic device;
- deactivating a light-emitting unit of a first camera module, which comprises a first camera which is an infrared camera and the light-emitting unit which emits an infrared light, or both the first camera and the light-emitting unit, based on determining that the object is located within the first distance from the electronic device;
- determining, based on an image of the object being acquired using using a second camera module comprising a second camera which is an RGB (red/green/blue) camera, a distance between the object and the electronic device; and
- based on the determined distance being greater than or equal to a second distance between the object and the electronic device, the second distance being longer than the first distance:
  - activating the light-emitting unit or both the light-emitting unit and the first camera;
  - acquiring an image of an iris of the object using the light-emitting unit and the first camera; and
  - performing, based on the image of the iris, iris authentication.

9. The storage medium of claim 8, wherein the at least one operation further comprises:
- activating the first camera module, based on determining that the object is not located within the first distance from the electronic device; and
- performing iris authentication using the first camera module.

10. The storage medium of claim 8, wherein the at least one operation further comprises deactivating the first camera module upon elapse of a threshold time from when the first camera module is activated and the object is detected using the second camera module.

11. The storage medium of claim 8, wherein the at least one operation further comprises:
- activating the second camera module;
- determining whether an object is detected from image data output through the second camera module; and
- activating the first camera module based on detecting the object.

12. The storage medium of claim 11, wherein the at least one operation further comprises deactivating the first camera module based on the object not being detected from the image data.

13. The storage medium of claim 8, wherein the at least one operation further comprises:
- activating the first camera module and the second camera module; and
- deactivating the second camera module based on determining, using the sensor, that the object is located within the first distance from the electronic device.

14. The storage medium of claim 13, wherein the at least one operation further comprises:
- performing iris authentication using the second camera module based on the object not being located within the first distance from the electronic device.

15. An operation method for an electronic device, the operation method comprising:
- determining, using a sensor comprising a proximity sensor, whether an object is located within a first distance from the electronic device;
- deactivating a light-emitting unit of a first camera module, which comprises a first camera which is an infrared camera and the light-emitting unit which emits infrared light, or both the first camera and the light-emitting unit, based on determining that the object is located within the first distance from the electronic device;
- determining, based on an image of the object acquired using a second camera module comprising a second camera which is an RGB (red/green/blue) camera, a distance between the object and the electronic device; and
- based on the determined distance being greater than or equal to a second distance between the object and the electronic device, the second distance being longer than the first distance:
  - activating the light-emitting unit or both the light-emitting unit and the first camera;
  - acquiring an image of an iris of the object using the light-emitting unit and the first camera; and
  - performing, based on the image of the iris, iris authentication.

16. The operation method of claim 15, further comprising:
- activating the first camera module, based on determining that the object is not located within the first distance from the electronic device; and
- performing iris authentication using the first camera module.

17. The operation method of claim 15, further comprising deactivating the first camera module upon elapse of a threshold time from when the first camera module is activated and the object is detected using the second camera module.

18. The operation method of claim 15, further comprising:
- activating the second camera module;
- determining whether an object is detected from image data output through the second camera module; and
- activating the first camera module based on detecting the object.

19. The operation method of claim 18, further comprising deactivating the first camera module based on the object not being detected from the image data.

20. The operation method of claim 15, further comprising:
- activating the first camera module and the second camera module; and
- deactivating the second camera module based on determining, using the sensor, that the object is located within the first distance from the electronic device.

* * * * *